US006416903B1

United States Patent
Fierro et al.

(12)
(10) Patent No.: US 6,416,903 B1
(45) Date of Patent: Jul. 9, 2002

(54) NICKEL HYDROXIDE ELECTRODE MATERIAL AND METHOD FOR MAKING THE SAME

(75) Inventors: Cristian Fierro, Northville; Michael A. Fetcenko, Rochester Hills; Stanford R. Ovshinsky, Bloomfield Hills; Dennis A. Corrigan, Troy; Beth Sommers, Clarkston; Avram Zallen, West Bloomfield, all of MI (US)

(73) Assignee: Ovonic Battery Company, Inc., Troy, MI (US)

( * ) Notice: Subject to any disclaimer, the term of this patent is extended or adjusted under 35 U.S.C. 154(b) by 0 days.

(21) Appl. No.: 09/619,039

(22) Filed: Jul. 18, 2000

Related U.S. Application Data

(63) Continuation-in-part of application No. 09/135,477, filed on Aug. 17, 1998, now Pat. No. 6,228,535, and a continuation-in-part of application No. 09/135,460, filed on Aug. 17, 1998, now Pat. No. 6,177,213.

(51) Int. Cl.$^7$ ................................................ H01M 4/32
(52) U.S. Cl. .................... 429/223; 429/229; 429/231.6; 429/220; 429/224; 429/218.1
(58) Field of Search .................................. 429/223, 229, 429/231.6, 218.1, 220, 224

(56) References Cited

U.S. PATENT DOCUMENTS

| 5,840,269 A | | 11/1998 | Shin et al. ................... 423/592 |
| 6,040,007 A | * | 3/2000 | Junichi et al. ............... 427/215 |
| 6,136,473 A | * | 10/2000 | Furukawa et al. ........ 429/218.2 |

FOREIGN PATENT DOCUMENTS

| JP | 7-114919 | * | 5/1995 |
| JP | 11-307092 | * | 11/1999 |

* cited by examiner

Primary Examiner—Laura Weiner
(74) Attorney, Agent, or Firm—Dean B. Watson; Marvin S. Siskind

(57) ABSTRACT

A nickel hydroxide particle having a first active nickel hydroxide material and a second active nickel hydroxide material disposed about the first material, wherein the second active nickel hydroxide material has a mass at least 10% of the total particle mass. In a preferred embodiment of the invention the first active material and the second active material have a compositional difference of 1 to 25.

34 Claims, 2 Drawing Sheets

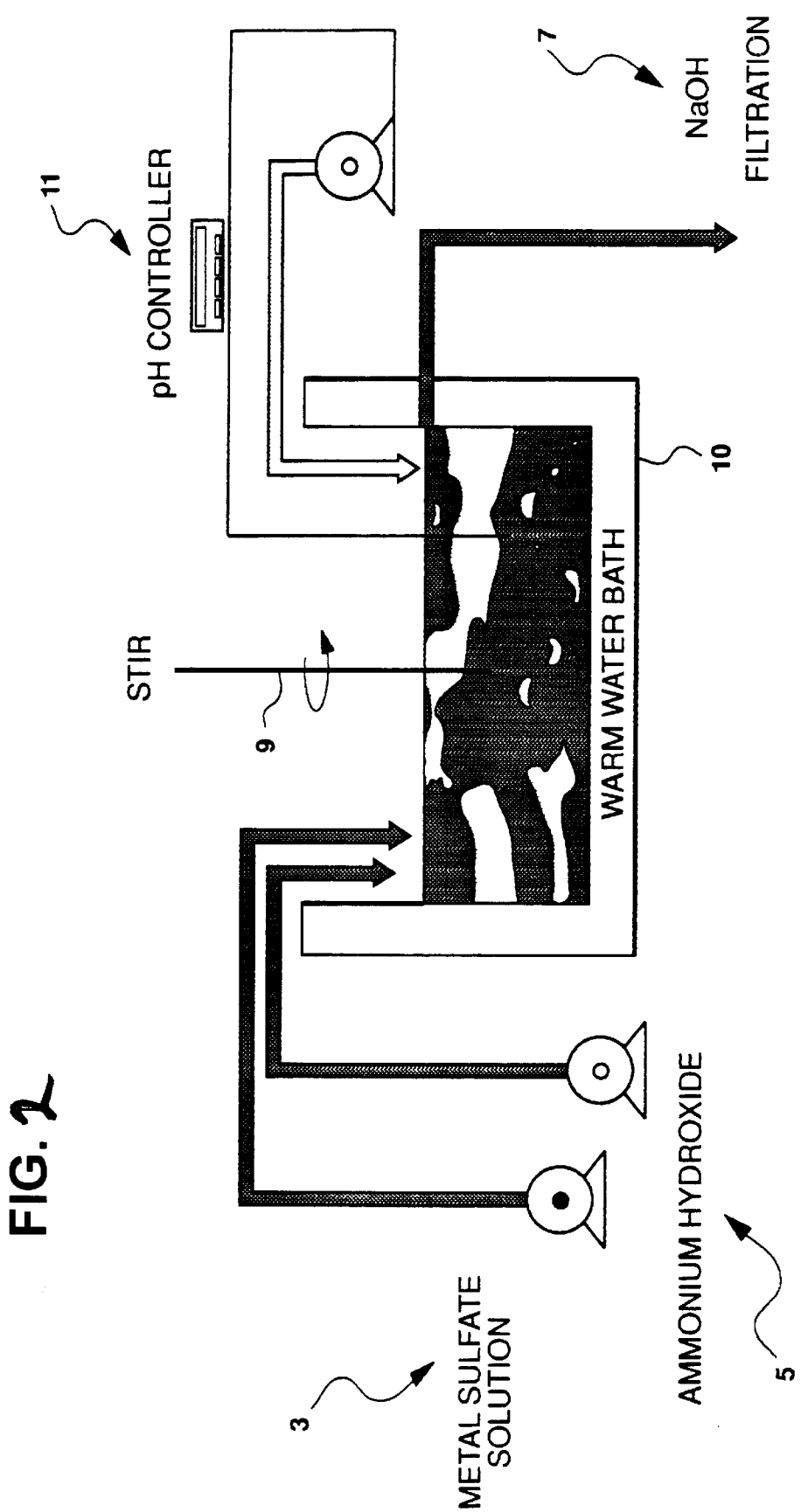

NICKEL HYDROXIDE ELECTRODE MATERIAL AND METHOD FOR MAKING THE SAME

REFERENCE TO RELATED APPLICATIONS

The present invention is a continuation in part of U.S. patent applications: Ser. No. 09/135,477, now U.S. Pat. No. 6,228,535 "Nickle Positive Electrode Material Exhibiting Improved Conductivity and Engineered Activation Energy" by Fierro et al., filed Aug. 17, 1998; and Ser. No. 09/135,460, now U.S. Pat. No. 6,177,213 entitled "Composite Positive Electrode Material and Method for Making Same" by Fetcenko et al., filed Aug. 17, 1998.

BACKGROUND OF THE INVENTION

I. Field of the Invention

The present invention pertains to active, multi-layered, positive electrode materials. More particularly, the present invention pertains to a multi-layered, nickel hydroxide particle and a method for making the same.

II. Description of the Prior Art

There presently exists a need for a nickel hydroxide powder having enhanced intra-particle properties such as cycle life, conductivity and improved high temperature performance without reduced capacity, the invention of which has not been addressed heretofore or met by the below discussed references.

Nickel hydroxide is used as an active positive electrode material in several types of battery systems and has been commercially available for a number of years. Two types of battery systems include the highly toxic Ni—Cd (nickel cadmium) type and the more desirable Ni—MH (nickel metal hydride) type.

Ni—MH cells utilize a negative electrode that is capable of reversible electrochemical hydrogen storage. Ni—MH cells employ a positive electrode made with nickel hydroxide material. The negative and positive electrodes are spaced apart in an alkaline electrolyte. Upon application of an electrical potential across a Ni—MH cell, the Ni—MH material of the negative electrode is charged by the electrochemical absorption of hydrogen and the electrochemical discharge of an hydroxyl ion. The negative electrode reactions are reversible, as shown in equation 1.

$$M+H_2O+e^- \leftrightharpoons M-H+OH^- \quad (1)$$

Upon discharge, the stored hydrogen is released to form a water molecule and release an electron.

The reactions that take place at the nickel hydroxide positive electrode are shown in equation 2.

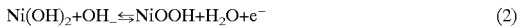

$$Ni(OH)_2+OH^- \leftrightharpoons NiOOH+H_2O+e^- \quad (2)$$

The use of nickel hydroxide as a positive electrode material for batteries is generally known. See for example, U.S. Pat. No. 5,523,182, issued Jun. 4, 1996 to Ovshinsky et al., entitled "Enhanced Nickel Hydroxide Positive Electrode Materials For Alkaline Rechargeable Electrochemical Cells", the disclosure which is herein incorporated by reference.

Nickel metal hydride batteries are typically positive material limited or negative material biased. This means that more active negative material is present in a cell than active positive material. The purpose of negatively biasing a battery is to prevent damage to the active negative material during over-charging. Over-charging a non-biased nickel metal hydride battery produces competing reactions which can oxidize and corrode negative metals. The resulting corrosion is not reversible, therefore over charging can permanently damage active negative material. Because the cell is negative material biased, the capacity of a cell is determined by the capacity of the active positive material present. The active positive material adds a significant amount of weight to a battery. By improving the capacity of the active positive material, less positive material is required per cell, thereby reducing the overall battery weight.

Several forms of positive electrodes exist at the present and include sintered, foamed, and pasted electrode types. Processes for making positive electrodes are generally known in the art, see for example U.S. Pat. No. 5,344,728 issued to Ovshinsky et al., the disclosure of which is herein incorporated by reference, where capacity in excess of 560 mAh/cc was reported. The particular process used can have a significant impact on an electrode's performance. For example, conventional sintered electrodes normally have an energy density of around 480–500 mAh/cc. Sintered positive electrodes are constructed by applying nickel powder slurry to a nickel-plated, steel base followed by sintering at high temperature. This process causes the individual particles of nickel to weld at their points of contact, resulting in a porous material that is approximately 80% open volume and 20% solid metal. This sintered material is then impregnated with active material by soaking it in an acidic solution of nickel nitrate, followed by the conversion to nickel hydroxide by reaction with an alkali metal hydroxide. After impregnation, the material is subjected to electrochemical formation.

To achieve significantly higher loading, the current trend has been away from sintered positive electrodes and toward pasted electrodes. Pasted electrodes consist of nickel hydroxide particles in contact with a conductive network or substrate, most commonly nickel foam. Several variants of these electrodes exist and include plastic-bonded nickel electrodes, which may utilize graphite as a microconductor, and pasted nickel fiber electrodes, which utilize spherical nickel hydroxide particles loaded onto a high porosity, conductive nickel fiber or nickel foam support.

As with electrode formation, the properties of nickel hydroxide also differ widely depending upon the production method used. Generally, nickel hydroxide is produced using a precipitation method in which a nickel salt solution and a hydroxide salt solution are mixed together followed by the precipitation of nickel hydroxide. Active, nickel hydroxide material preferably has high capacity and long cycle life, see U.S. Pat. No. 5,348,822 to Ovshinsky et al., the disclosure of which is herein incorporated by reference.

In order to produce high density, substantially spherical particles, nickel hydroxide crystals are grown relatively gradually under carefully controlled process conditions. A nickel salt provided in solution is combined with an ammonium ion. The nickel salt forms complex ions with ammonia to which caustic is added. Nickel hydroxide is then gradually precipitated by decomposition of the nickel ammonium complex. The reaction rate is difficult to control, so methods have been introduced to separate critical reaction steps in the production process to compensate for said difficulties. For example, U.S. Pat. No. 5,498,403, entitled "Method for Preparing High Density Nickel Hydroxide Used for Alkali Rechargeable Batteries", issued to Shin on Mar. 12, 1996, the disclosure of which is herein incorporated by reference, discloses a method of preparing nickel hydroxide from a nickel sulfate solution using a separate or isolated amine reactor. Nickel sulfate is mixed with ammonium hydroxide in the isolated amine reactor to form nickel ammonium complex. The nickel ammonium complex is removed from the reactor and sent to a second mixing vessel or reactor where it is combined with a solution of sodium hydroxide to obtain nickel hydroxide. Such a method relies heavily on a raw material source of very high purity.

Improvements to nickel hydroxide materials have received significant attention in recent years as can be seen from the following patents.

U.S. Pat. No. 5,861,225 entitled "Nickel Battery Electrode Having Multiple Composite Nickel Hydroxide Active Materials," issued Jan. 19, 1999 to Corrigan et al. discloses a nickel hydroxide material having discrete layers of differing redox potentials to improve active material utilization by forcing a stepwise discharge of the material to avoid isolating active material regions.

U.S. Pat. No. 5,523,182 entitled "Enhanced Nickel Hydroxide Positive Electrode Materials For Alkaline Rechargeable Electrochemical Cells," issued Jun. 4, 1996 to Ovshinsky et al. discloses a cobalt hydroxide layer or cobalt oxyhydroxide encapsulant layer formed about a positive electrode material. The patent teaches the desirability of an outer coating rich in cobalt.

U.S. Pat. No. 5,840,269 to Shin et al discloses a double layer nickel hydroxide material having a thin outer shell with high cobalt concentrations. The spray procedure provides a thin layer of material with over 10 wt % cobalt and which is less than 6% of the total mass. The process conditions utilized in Shin, being 2.0–2.8 mole/liter $NiSO_4$, ammonium hydroxide at 12–16 mole/liter, and NaOH at 5–8 mole/liter are inappropriate for a practical commercial process, and generate excess amounts of waste while making achievement of sufficient tap density practically impossible. While it may be generally known to have a thin outer layer of active material with high cobalt, the art has not gone further in teaching or suggesting formulations that offer improvements over such disclosures. Thus, Shin does little to suggest any benefits nor does it advance the art as related to increasing material performance, such as cycle life or capacity, other than by adjusting the outer layer for a thin but high cobalt concentration, which was previously taught in U.S. Pat. No. 5,523,182 described above, and assigned to the assignee of the present invention. Further, Shin does not suggest any benefit to using more than a two element outer layer. Additionally, the Shin process is not suitable for depositing Ca in the outer layer due to premature precipitation problems with the Shin preamine reactor system. Therefore, Shin does not provide an enabling disclosure as to Ca.

U.S. Pat. No. 5,611,823 entitled "Method for Fabricating a Battery Electrode," discloses an electrochemically active material prepared by coating non-conductive to low-conductive particles of a metal hydroxide or metal oxide powder with nickel to enhance conductivity of the particles using an initial sensitizing solution.

As can be seen in the above disclosures, a thin external layer has been added to nickel hydroxide particles to improve particle-to-particle interaction. But, even in this highly crowded field of active positive materials, modern day nickel hydroxide materials have failed to deliver the requisite intra-particle, high storage capacity, high temperature performance, high rate, low cost, long cycle life materials needed for further advancement of rechargeable batteries.

SUMMARY OF THE INVENTION

The present invention, to address the above mentioned deficiencies and others, provides a new and improved active positive electrode particle having a plurality of active materials. The active materials include a first active positive electrode material; and a second active positive electrode material disposed about the first material, the second active positive electrode material having a mass that is 10% or greater than the total particle mass.

In a preferred aspect hereof the second material has a plurality of channels extending from an outer most portion to an inner-most portion of the second material for providing ion transport between an electrolyte and the first active material.

In preferred embodiment hereof, the active positive electrode particle is a nickel hydroxide particle having a first active nickel hydroxide material, and a second active nickel hydroxide material disposed about the first material, wherein the second active nickel hydroxide material has a mass of at least 10% of the particle mass.

In another preferred embodiment of the present invention the first material and the second material have different but similar compositions with a compositional difference of 1 to 25 atomic % and more preferably 1 to 18 atomic %.

In a third preferred embodiment hereof there is provided a positive electrode particulate as described above having enhanced conductivity, wherein the first and/or the second active material or both have an embedded metallic conductive material.

In a fourth preferred embodiment hereof there is provided a multi-compositional positive electrode particulate as described above wherein the second material is an outer material having a cycle life greater than the first or inner material.

In another aspect of the present invention there is provided a method of making a multi-compositional nickel hydroxide material by exposing an active seed material to a precipitation reaction for a residence time sufficient to provide a layer of active material having a mass of at least 10% of the particle mass on the seed.

Particles of the present invention may be combined to form a powder for use in electrochemical battery electrodes. For a more complete understanding of the present invention, reference is now made to the following detailed description of preferred embodiments and the accompanying drawings.

BRIEF DESCRIPTION OF THE DRAWINGS

FIG. 2 is a process diagram of a method of making a particle in accordance with the present invention.

DETAILED DESCRIPTION OF PREFERRED EMBODIMENTS

Figure 1:
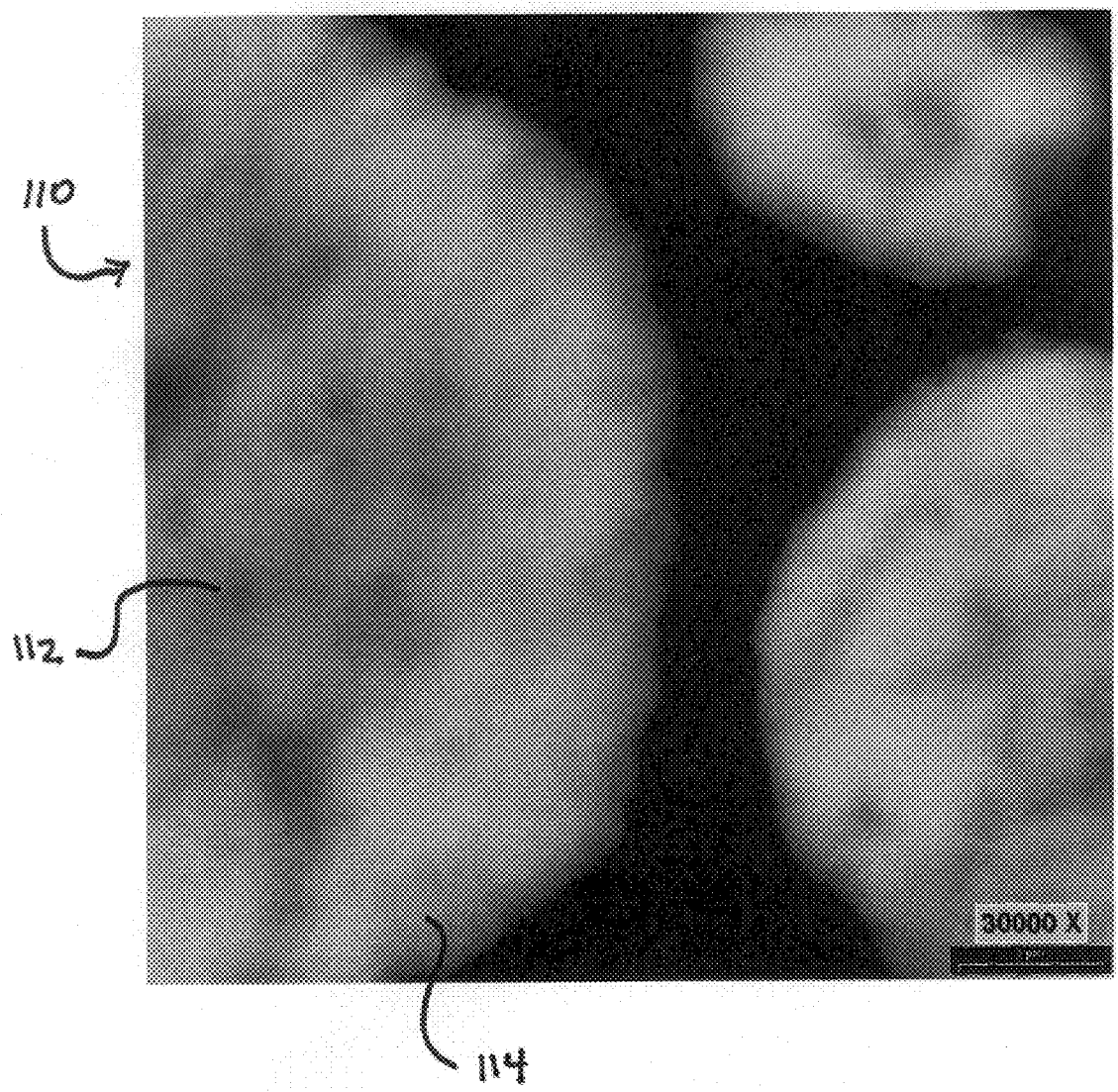
FIG. 1 is a cross-sectional view of an encapsulated nickel hydroxide electrode material in accordance with the present invention.

Now in more detail and referring to FIG. 1, depicted therein at 110 is an active, multi-compositional, composite positive electrode particle having a first active positive electrode material 112; and a second active positive electrode material 114 disposed about the first material, the second active positive electrode material having a mass that is at least 10% of the total particle mass. A second material having a large mass and a preferred composition as described below adds a significant amount of electrochemical storage capacity to the active, multi-compositional particle.

A plurality of multi-compositional active positive electrode particles in accordance with the present invention may be amassed to form a powder for use in all types of positive battery electrodes, but finds instant application without modification in pasted type positive battery electrodes for nickel metal hydride batteries. The powder may be combined with other battery electrode additives, many of which are conventional and generally know in the art, including cobalt and cobalt hydroxide powders, binders, metal and metal oxide powders, calcium hydroxide powders, etc.

The active, multi-compositional particle 100 is preferably substantially spherical in shape with a particle size of about 5–50 μm and more preferably with a size of about 8–12 μm. The particle preferably has an apparent density of 1.4–1.7 g/cm³ and a tap density of about 1.8–2.3 g/cm³. Paste made with these kinds of active particles has good fluidity and uniformity, thereby making it is possible to fabricate high capacity, uniformly loaded electrodes therefrom. The use of these kinds of active particles also improves the utilization of the active material and the discharge capacity of the electrode.

As stated above, the particle has a first electrochemically active positive electrode material and a second electrochemically active positive electrode material disposed about the first. The first material is an inner material and the second active material is an outer material relative to the first material. Thus, the terms inner and outer refers to the relative positioning of the first and second materials relative to each other and the center of the particle and not necessarily to the relative positioning about the particle.

Preferably, the first material is an electrochemically active core material. If the first material is a core material, the core is at most 90% of the total particle mass. The first material may also be an active outer core material, as may be the case when the first material surrounds another core substrate to form a layer, such as another active core material, a conductive core (as discussed in more detail herein below), etc.

The second material is disposed about the first material and may completely surround the first material as a layer. The second material is preferably the outer-most material of the particle, i.e. crust, which encapsulates or substantially encapsulates both the particle and the first material. In either case the second material is preferably adjacent to the first material, thereby forming a composite particle of two different active materials that are in contact with one another. The second material is preferably a discrete layer completely surrounding the first material. Discrete layers are layers that form an identifiable boundary on a microscopic as opposed to atomic level. Thus the inner material and the outer material do not substantially form an homogenous solid solution, even though the boundary between active materials may be a graded concentration or a diffusion of compositions.

The second active material has a mass sufficient for varying aggregate intra-particle properties to obtain enhanced utilization and to provide a significant amount of electrochemical storage capacity. The mass may be at least 10% of the total particle mass. Preferably, the mass of the outer active material is at least 20%, more preferably is at least 30%, and most preferably is at least 40% of the total particle mass. Preferably, each active material has a mass for providing a significant amount of electrochemical storage capacity, e.g. a mass equal to 10% or more of the total particle mass. If the first material is an outer core, the first material preferably has a mass of 60% to 90% of the total particle mass. In a preferred embodiment hereof, the first or inner material has a mass of 45% to 60% of the total particle mass and the second or outer material has a mass of 40% to 55% of the total particle mass. For example, if the particle is a composite particle having a conductive metallic core, an active outer core material and an active encapsulating material, the conductive core material may constitute 5% of the total particle mass, the active outer core material may constitute 77% of the total particle mass and the active encapsulating material may constitute the remaining 18% of the total particle mass. In another preferred embodiment hereof, powder formed with particles of the present invention have a first or inner material with an average mass of 45% to 60% of the total particle mass and have a second or outer material with an average mass of 40% to 55% of the total particle mass. Providing each active material with a large mass enhances intra-particle electrochemical storage capacity.

The first and second active materials are preferably nickel hydroxides suitable for use in a positive electrode of a nickel metal hydride battery. The second material preferably has a composition with a significant amount of electrochemical storage capacity, e.g. a nickel hydroxide material with at least 85% Ni, more preferably at least 88% Ni and most preferably at least 90% Ni. The first and second active materials preferably have a metal composition characterized by the base formula $Ni_aX_x$, wherein X is three or more modifiers selected from the group consisting of Al, Ba, Bi, Ca, Cr, Co, Cu, F, Fe, In, K, La, Li, Mg, Mn, Na, Ru, Sb, Sn, Sr, Ti, and Zn. These elements may each be present in solid solution in amounts of 15 atomic % or less, more preferably in amounts of 9 atomic % or less, and most preferably in amounts of 7 atomic % or less. X is preferably three or more modifiers selected from the group consisting of Co, Zn, Mg, Ca, Mn, Cu, Fe, and Al, and a is 85 to 98 and a+x=100.

Preferred multi-element modified nickel hydroxide materials have an inner and an outer active material composition selected from the following base compositions:

(NiCo)(OH)$_2$
(NiCoZn)(OH)$_2$
(NiCoZnMgCa)(OH)$_2$
(NiCoZnMnMgCa)(OH)$_2$
(NiCoZnMgCaCuMn)(OH)$_2$.

Calcium and magnesium in combination with cobalt and zinc are most preferred modifiers. It is believed that Ca and Mg synergistically act to enhance the effects of various intra-particle electrochemical properties when each are present in solid solution at a concentration of 2 atomic % or less, and more preferably at a concentration of 0.1 to 2 atomic % and most preferably 0.25 to 1.75, with Co and Zn.

Compositions that may also work well in active composite particles of the present invention include those discussed in U.S. Pat. No. 5,348,822 and in co-pending U.S. patent application Ser. Nos. 09/135,477 and 09/135,460, the disclosures of which are herein incorporated by reference. Other examples of nickel hydroxide materials having varying compositions and applicable to the present invention include those described above, in the background and others, including U.S. Pat. Nos. 5,523,182; 5,348,822; 5,344,728; and 6,019,955, the disclosures of which are herein incorporated by reference.

Particles in accordance with a preferred embodiment of the present invention may additionally have a plurality of channels extending from an outer-most portion to an inner-most portion of the second material for providing ion transport between an electrolyte and the first or inner active material. The channels may be any shape, including circular, oblong, asymmetrical, etc. The channels preferably have an average pore radius of 35 angstroms or greater. Thus, the channels extend from an outer surface of an outer active material to the inner active material through a plurality of interconnected passage ways and are a size suitable for providing ion transport between an electrolyte and the inner material Channels may be formed by providing an outer active material having a preferred composition, as in FIG. 1, and made by the method described below.

An important aspect of a preferred embodiment is that adjacent active materials have compositions that are significantly different yet somewhat similar. By making the inner material composition different from the outer material composition by a small but significant amount, electrochemical properties of the inner material may be enhanced without degradation of aggregate electrochemical properties. For example, an outer material may be formulated with an outer composition to maximize a first property, such as high cycle life, and the inner material may be formulated with a second composition to maximize a second property, such as high temperature performance. In this case, it has been particularly found that high temperature performance may be approximated as an average contribution of the first and second materials while cycle life is dominated by the outer material. Because the outer material is a porous active material having a large mass and a significantly different yet similar composition, high temperature performance of the inner material may be determined by the aggregate composition of the particle. Thus, a nickel hydroxide particle may have a first electrochemical property or characteristic primarily defined by the first or outer material and a second electrochemical property or characteristic primarily defined by a combination of the first and second materials. Hence, a crucial insight gained by the present invention is the recognition that functional properties of the nickel hydroxide can be separated into bulk and surface, or alternatively for descriptive purposes 'inner shell' and 'outer shell'. The inventors of the present invention have found that contrary to conventional wisdom, cycle life seems to be dominated by the 'outer shell' composition and structure, whereas high temperature performance is a graded average of the two formulas. Thus, the crucial insight is not that a two layer, or a multiple layer, active material may be formed but rather the design principles to provide optimized materials.

As stated above, the difference in active material compositions is preferably significantly different yet somewhat similar. The difference between compositions may be determined by calculating how the metal compositions differ between materials, or what is termed herein as compositional difference and measured in atomic %. Although riot desiring to be bound by theory, one proposed reason for enhanced effects from a small compositional difference is due to the avoidance of adverse boundary effects. Adverse boundary effects may include inhibiting ion diffusion or electron transport between active materials. A preferred compositional difference between adjacent nickel hydroxide active materials is 1 to 25 atomic % as characterized by:

the first material having a metal composition characterized by $Ni_a(B_bC_cD_dE_e, \ldots M_m)$, where a is 85 to 98 atomic %, b through m are each 0 to 15 atomic %, $a+b+c+d+e+ \ldots +m=100$ atomic %;

the second material having a metal composition characterized by $Ni_{a'}(B_{b'}C_{c'}D_{d'}E_{e'}, \ldots M_{m'})$, where a' is 85 to 98 atomic %, b' through m' are each 0 to 15 atomic %, $a'+b'+c'+d'+e'+ \ldots +m'=100$ atomic %.;

wherein B, C, D, E, ... M are modifiers selected from the group consisting of Al, Bi, Ca, Co, Cr, Cu, Fe, In, La, rare earth metals, Mg, Mn, Ru, Sb, Sn, Ti, Zn, Ba, Si and Sr; and wherein 1 atomic $\% \leq |a-a'|+|b-b'|+|c-c'|+|d-d'|+|e-e'|+ \ldots +|m-m'| \leq 25$ atomic %.

The coefficients a through m' represent the atomic % of the corresponding element present. The coefficients b through m and b' through m' are each 0 to 15 atomic %, and preferably 0 to 9 atomic %. Modifiers B, C, D, E, etc ... are preferably selected from the group consisting of Co, Zn, Mg, Ca, Mn, Cu. Fe, and Al. More preferably, modifiers B, C, D, and E are Co, Zn, Mg, and Ca, respectively; and $3 \leq b \leq 9$; $3 \leq b' \leq 9$;

$0 \leq c \leq 7$; $0\ 0 \leq c' \leq 7$;

$0.25 \leq d \leq 2$; $0.25 \leq d' \leq 2$;

$0.25 \leq e \leq 2$; $0.25 \leq e' \leq 2$, where $a+b+c+d=100$ atomic % and $a'+b'+c'+d'=100$ atomic %.

Particles with active materials that have a compositional difference of 1 to 25, more preferably 1 to 18 and more preferably 1 to 16 and most preferably 2 to 13 will have improved inter-particle electrochemical activity yet be similar enough in composition to provide enhanced intra-particle electrochemical activity.

Examples of preferred inner materials include nickel hydroxides having the following metal compositions: $Ni_{91}Co_{4.5}Zn_{4.5}$, $Ni_{91}Co_7Zn_{0.5}Mg_{0.5}Ca_1$, $Ni_{93.5}Co_5Zn_{0.5}Mg_{0.5}Ca_{0.5}$, $Ni_{91}Co_3Zn_1Mg_1Ca_2Cu_2$, $Ni_{95}Co_3Zn_{0.5}Mg_{0.5}Ca_1$, $Ni_{90.5}Co_3Zn_1Mg_1Ca_{2.0}Cu_{1.5}Al_{1.0}$, $Ni_{86}Co_7Zn_6Mg_{0.5}Ca_{0.5}$, and $Ni_{93}Co_5Zn_{0.5}Mg_{0.5}Ca_1$ Examples of preferred outer or encapsulating materials include nickel hydroxides having the following metal compositions: $Ni_{91}Co_{4.5}Zn4.5$, $Ni_{91}Co_7Zn_{0.5}Mg_{0.5}Ca_1$, $Ni_{93.5}Co_5Zn_{0.5}Mg_{0.5}Ca_{0.5}$, $Ni_{91}Co_3Zn_1Mg_1Ca_2Cu_2$, $Ni_{95}Co_3Zn_{0.5}Mg_{0.5}Ca_1$, $Ni_{90.5}Co_3Zn_1Mg_1Ca_2Cu_{1.5}Al_{1.0}$, $Ni_{86}Co_7Zn_6Mg_{0.5}Ca_{0.5}$, $Ni_{89.8}Co_{10}Zn_{0.1}Mg_{0.1}$, $Ni_{84.8}Co_{15}Zn_{0.1}\ Mg_{0.1}$ and $Ni_{93}Co_5Zn_{0.5}Mg_{0.5}Ca_1$ Referring again to FIG. 1, the core is an active material having a metal composition characterized by $Ni_{95}Co_3Mg_{0.5}Zn_{0.5}$ and an outer active material having a metal composition characterized by $Ni_{91}Co_{4.5}Zn_{4.5}$. The core material and the outer material are similar but significantly different and have a compositional difference characterized by the sum of the absolute values of the difference between the core material and the outer material on a per metal element basis which is equal to 11 as shown below in Example 1. Additionally, the particle has an outer active encapsulating material with a cycle life greater than the inner material.

EXAMPLE 1

| first or inner material | $Ni_{95}Co_3Mg_{0.5}Zn_{0.5}Ca_{1.0}$ |
|---|---|
| second or outer material | $Ni_{91}Co_{4.5}Zn_{4.5}$ | wherein the compositional difference is $|95-91|+|3-4.5|+|0.5-4.5|+|0.5-0|+|1.0-0|=11$.

Examples of other materials in accordance with the present invention include:

EXAMPLE 2

| first or inner material | $Ni_{91}Co_{4.5}Zn_{4.5}$ |
|---|---|
| second or outer material | $Ni_{95}Co_3Mg_{0.5}Zn_{0.5}Ca_{1.0}$ | wherein the compositional difference is $|91-95|+|4.5-3|+|4.5-0.5|+|0-0.5|+|0-1.0|=11$.

EXAMPLE 3

| first or inner material | $Ni_{91}Co_{4.5}Zn_{4.5}$ |
|---|---|
| second or outer material | $Ni_{91}Co_7Mg_{0.5}Zn_{0.5}Ca_{1.0}$ | wherein the compositional difference is $|91-91|+|4.5-7|+|4.5-0.5|+|0-0.5|+|0-1.0|=8$.

EXAMPLE 4

| first or inner material | $Ni_{95}Co_5$ |
|---|---|
| second or outer material | $Ni_{95}Co_3Mg_{0.5}Zn_{0.5}Ca_{1.0}$ | wherein the compositional difference is $|95-95|+|5-3|+|0-0.5|+0-0.5|+|1-1.0|=4$.

EXAMPLE 5

| first or inner material | $Ni_{95}Co_3Zn_2$ |
|---|---|
| second or outer material | $Ni_{88.5}Co_{7.0}Zn_{3.5}Mg_{0.5}Ca_{0.5}$ | wherein the compositional difference is $|95-88.5|+|3-7|+|2-3.5|+|0-0.5|+|0-0.5|=13$.

EXAMPLE 6

| first or inner material | $Ni_{91}Co_{4.5}Zn_{4.5}$ |
|---|---|
| second or outer material | $Ni_{93}Co_5Mg_{0.5}Zn_{0.5}Ca_{1.0}$ | wherein the compositional difference is $|91-93|+|4.5-5|+|4.5-0.5|+|0-0.5|+|0-1.0|=8$.

EXAMPLE 7

| first or inner material | $Ni_{95}Co_3Mg_{0.5}Zn_{0.5}Ca_{1.0}$ |
|---|---|
| second or outer material | $Ni_{93}Co_3Mg_{0.5}Zn_{0.5}Ca_{1.0}$ | wherein the compositional difference is $|92-93|+|3-5|0.5-0.5|+|0.5-0.5|+|1.0-1.0|=3$.

Another aspect of the present invention is to provide a composite, active positive electrode particle having increased conductivity. Increased conductivity is provided by particles having a conductive material at least partially embedded in a positive active material, as described in U.S. patent application Ser. No. 09/135,460, the disclosure of which is herein incorporated by reference. As disclosed therein, the conductive material is preferably a solid conductive metal or metal alloy. The embedded solid conductive material provides increased intra-particle conductivity. The conductive metal or metal alloy may be bits, pieces, chunks, fibers, flakes or the like preferably having a size of 1–6 microns. The embedded conductive material may be fixed within the particle at any location. In one embodiment hereof the conductive material is embedded within the first material. In a preferred embodiment, the metallic conductive material forms the core of the particle. The conductive material may also be embedded within the inside of the second active material or alternatively, distributed within both the first and second active materials. Additionally, the conductive material may also be embedded in the boundary between the first and second materials, such as embedded in the boundary between active materials. It should be duly noted that an embedded conductive material in accordance with the present invention is different than a conductive powder additive, which may be provided solely around the outside of the particle to decrease inter-particle resistivity as opposed to reducing intra-particle resistivity.

The active, composite particle of the present invention may be formed by any suitable method, but is preferably formed by an electroless precipitation reaction using a continuous and simultaneous supply of reactants with rapid stirring. Nickel hydroxide material produced in accordance with the below detailed method provides particles having a shape, a particle size, a tap density, and a crystallinity suitable for use as an active positive electrode material.

A single reactor system is preferred for practicing the present invention as the single reactor system provides improved process control, avoids premature precipitation, and permits greater system tolerance for unknown dissolved materials, insoluble conductive particles, and multiple modifiers. Thus, a second aspect of the invention recognizes that to form a multi-compositional, multi-modified active particle, the precipitation process is crucial to the ultimate suitability of the nickel hydroxide end product. A single precipitation reaction, instead of the common two reactor system with a preamine initial reaction provides such a process.

The method includes the steps of providing an active core or seed material and exposing the seed to a precipitation reaction having a residence time suitable for producing an encapsulating layer with a mass greater than 10%, preferably greater than 20%, and more preferably greater than 30% of the particle mass. The residence time of the seed in the precipitation reaction is at least 30 minutes.

The active seed may be formed by combining solutions of $MeNO_3$, $MeSO_4(3)$, $NH_4OH(5)$ and $NaOH(7)$ in a single reactor (10), maintaining the reactor at a constant temperature of 20–100° C. (more preferably 40–80° C. and most preferably 50–70° C.), agitating (9) the combination at a rate of 400–1000 rpm (more preferably 500–900rpm and most preferably 700–800 rpm), controlling the pH (11) of the agitating combination at a value between 9–13 (more preferably at 10–12 and most preferably at 10.5–12.0) and controlling both the liquid phase and vapor phase ammonia concentration. The Me or metal solutions may include Ni and various modifier(s) (as described above) that will be incorporated into the final nickel hydroxide bulk particles. Modifiers may be supplied with the initial, $MeSO_4$ solution whenever possible or may be supplied in the $MeNO_3$ solution.

The $MeSO_4$ solution may be formulated by mixing 3–30 wt %, more preferably 5–25% and most preferably 7–12% nickel sulfate with other sulfate solutions containing desired modifier(s). Overall, the metal sulfate solution added to the reactor is 0.5–10 M, more preferably 1–7 M and most preferably 2–5 M. The $NH_4OH$ solution added to the reactor is 2–30 M, more preferably 5–20 M and most preferably 8–15 M solution. The NaOH solution added to the reactor is 5–50 wt %, more preferably 8–40 wt % and most preferably a 15–30 wt %. Deionized or distilled water is preferably used throughout for all necessary dissolutions and dilutions.

As stated above, the pH of the mixture in the reactor must be carefully controlled. The control of the pH can be accomplished by any appropriate method, but is preferably controlled through the addition of a base as needed. The addition of a base such as KOH or NaOH is preferred. Most preferably, 20–60 wt % KOH or NaOH is used. The temperature of the mixture in the reactor should be maintained at the temperatures described above. In order to assure optimum contact between the components of the mixture introduced into the reactor, constant mixing or agitation should be provided. Mixing may be provided by any suitable method, such as stirring, agitating, vortexing or ultrasonic, but should attain the mixing rates as set forth herein above.

In order to efficiently incorporate calcium or other low solubility modifiers into the bulk of the modified nickel hydroxide particle of the present invention, it is preferable that calcium not be part of the metal sulfate solution (MeSO$_4$), rather, calcium should be formulated using a separate or second metal solution and introduced with a separate feed stream. Preferably, the feed stream is CaCl$_2$ or other solublizing solution, such as calcium nitrate, calcium acetate, etc . . . , where Ca may be introduced independently to the reactor. A separate solution may also be used for other insoluble materials that are desired to be provided in solid solution. The Ca salt solution introduced into the reactor may be 0.5–20 wt %, more preferably a 2–15 wt % and most preferably 11–18 wt %. Thus, in a preferred embodiment of the present invention, the method provides a novel continuous precipitation process that is capable of producing a nitrate-free active positive electrode material. The addition of each component and removal of the resultant slurry (containing precipitated nickel hydroxide material) is carefully controlled at complimentary rates so that the slurry contains a maximum amount of precipitate and a minimum amount of unreacted components. The seed particles provide a nickel hydroxide core of a first active material upon which a second active material may be grown.

The above described operating conditions for a continuous process have provided a remarkably high yield of 99.98%. The process is novel in several respects. First, it is completely new to apply a continuously stirred tank reactor (CSTR) concept to the manufacture of nickel hydroxide. Other references (see Hyundai Motor Company Patent No. 5,498,403) indicate the necessity of employing two reactors in series, involving the formation of a preamine complex. The two-reactor approach has been considered vital in order to achieve high density, spherical nickel hydroxide particles. However, the inventors believe two reactors in fact produce a number of disadvantages which arise in attempting to balance two vastly different reaction rates, that being the preamine complexing and nickel hydroxide precipitation. Disadvantages of the two reactor approach include:

premature precipitation in the first reactor resulting in poor tap density and uncontrolled particle size.

poor yield because very high excess ammonia must be used in the first reactor.

high effluent discharge because of the need for dilute sulfate solution.

complexity from an automatic control standpoint in balancing two reaction rates.

Premature equipment failure from corrosion in the second reactor due to the high pH (>12) necessary to break the nickel ammonia complex.

Prior to the invention hereof, the two-reactor approach was considered vital to nickel hydroxide production to ensure the formation of a nickel-ammonium complex prior to precipitation to slow the precipitation reaction and allow high density particles to form. The objective of high powder density cannot be overstated for use in batteries, as active material loading is crucial to the energy density of the overall positive electrode and the overall battery system. All known attempts to precipitate high density spherical nickel hydroxide without careful formation of the nickel-ammonium complex fail to achieve commercially viable high density material which has inevitably led to a world-wide use of the two reactor manufacturing process.

The present inventors have also found that a CSTR approach vastly simplifies processing. The inventors realized that the nickel-ammonium complex can be formed and destroyed simultaneously, that a short-life nickel-ammonium complex is not a problem as normally thought by others. Therefore, under the reactant concentrations described previously, and the reactor conditions of temperature, mixing, pH and constituent concentrations, formation of the nickel-ammonium complex and subsequent immediate precipitation to nickel hydroxide can occur simultaneously. The inventors have further recognized that the single reactor CSTR process can be used with a number of advantages, including:

the use of highly concentrated reactant solutions, effectively reducing the amount of effluent streams.

the use of lower pH, thereby extending equipment and process control life and reliability.

eliminating the need to "balance" two reactors, thus enhancing simplicity in processing.

Once the slurry is drawn off from the reactor, it is filtered to separate the precipitate from the liquid. The liquid is then recycled and the precipitate processed to produce the modified nickel hydroxide of the present invention.

It is thus possible to produce composite nickel hydroxide materials having three or more modifiers in the core and three or more modifiers in the crust without premature precipitation and process failure.

In the method of the instant invention, great care must be taken with certain unexpected processing parameters. For instance, the liquid saturation of ammonia versus its vapor or head space saturation in the reactor is critical. The present inventors have found that the ammonia concentration in the reactor significantly influences the final properties of the resultant powder with respect to crystallinity and tap density. Since ammonium hydroxide is continuously metered into the reactor, but is present in excess, part of the ammonia must be removed via the reactor head space. The inventors have found that care must be exercised to avoid a "crust" forming on the top of the liquid; that is to prevent the liquid surface which is exposed to air in the reactor from inadvertently charring. The incoming and exiting air stream in terms of air flow rate and humidity is also carefully controlled. For a 100 kg/day reaction vessel, the inventors have determined that an air flow of about 50 or greater ft$^3$/minute is adequate, with a relative humidity below about 65%. Properly managed, particles of the present invention having the proper density and degree of crystallinity are consistently obtainable in volume production. If, on the other hand, process parameters, such as head space saturation or concentration of ammonia are ignored, it is more likely than not that poor quality nickel hydroxide particles or seed will be produced.

To add a second active material about the seed, the seed is subjected to a second precipitation reaction using conditions similar to the operating conditions described above and by feeding the seed into the reaction with a MeSo$_4$ solution, a base and ammonium hydroxide for a residence time sufficient to form a nickel hydroxide particle having a second active material with a large mass, as described above. In accordance with the present invention, the MeSo$_4$ solution and/or any second metal solution (if used) are formulated to provide a composition different than the composition of the active seed. The residence time of the seed in the precipitation reaction is preferably 30 minutes or greater and may be controlled by a variety of methods, such as batch processing or continuous feed and decantation.

As may become apparent from the above disclosure it may also be advantageous to provide particles having multiple layers of active materials, such as three or more layers. Multiple layers may be formed with a first precipitation reaction to form a first layer of active material and each additional layer of active material may be added by a succeeding precipitation reaction.

An embedded metallic conductive material may be formed in the particle in a manner similar to that described above and by combining an active seed having a conductive metallic material embedded therein with a metal ion solution, a caustic solution, and an ammonium hydroxide material. The seed may be formed first by a first precipitation reaction, as described above, and by and by additionally adding a conductive metallic material with a metal ion solution, caustic, and ammonium hydroxide. The seed is then subjected to at least one additional precipitation reaction, as described above, to form a multi-compositional active positive electrode particle with enhanced conductivity.

While the invention has been illustrated in detail in the drawings and the foregoing description, the same is to be considered as illustrative and not restrictive in character, it is understood that only the preferred embodiments have been shown and described fully and that all changes and modifications that come within the spirit of the invention are desired to be protected.

What is claimed is:

1. A positive electrode particle comprising:
    a first active positive electrode material; and
    a second active positive electrode material disposed about the first material, the second active positive electrode material is at least 20% of the particle mass.

2. The positive electrode particle of claim 1 wherein the second active positive electrode material is 20% to 55% of the particle mass.

3. The positive electrode particle of claim 1 wherein the second material has a plurality of channels extending from an outer most portion to an inner most portion of the second material for providing ion transport between an electrolyte and the first active material.

4. The positive electrode particle of claim 3 wherein the channels have an average pore size of 35 angstroms or greater.

5. The positive electrode particle of claim 1 wherein the first material and second material have a compositional difference of 1 to 25 atomic %.

6. The positive electrode particle of claim 1 wherein the first material or the second material is a composite having an embedded metallic conductive material.

7. The positive electrode particle of claim 1 wherein the first material and second material have a compositional difference of 1 to 18 atomic %.

8. The positive electrode particle of claim 1 wherein the second active material comprises Co at a concentration of 9 atomic % or less.

9. The positive electrode particle of claim 1 wherein the second active material is a nickel hydroxide material comprising Co, Zn, Ca, and Mg.

10. The positive electrode particle of claim 1 wherein the first active material is a nickel hydroxide material comprising Co, Zn, Ca, and Mg.

11. The positive electrode particle of claim 1 wherein the first active material has a base composition selected from the group consisting of $(NiCo)(OH)_2$, $(NiCoZn)(OH)_2$, $(NiCoZnMgCa)(OH)_2$, $(NiCoZnMnMgCa)(OH)_2$, and $(NiCoZnMgCaCuMn)(OH)_2$.

12. The positive electrode particle of claim 1 wherein the second active material has a base composition selected from the group consisting of $(NiCo)(OH)_2$, $(NiCoZn)(OH)_2$, $(NiCoZnMgCa)(OH)_2$, $(NiCoZnMnMgCa)(OH)_2$, and $(NiCoZnMgCaCuMn)(OH)_2$.

13. The positive electrode particle of claim 1 wherein the second material has a cycle life greater than the first material.

14. A nickel hydroxide particle comprising:
    a first active nickel hydroxide material;
    a second active nickel hydroxide material disposed about the first material, wherein the second active nickel hydroxide material has a mass equal to at least 10% of the mass of the particle; and
    the first active nickel hydroxide material and the second active nickel hydroxide material have a compositional difference characterized by:
    the first material having a metal composition characterized by $Ni_a(B_bC_cD_dE_e, \ldots M_m)$, where a is 85 to 98 atomic %, b through m are each 0 to 15 atomic %, $a+b+c+d+e+ \ldots +m=100$ atomic %;
    the second material having a metal composition characterized by $Ni_{a'}(B_{b'}C_{c'}D_{d'}E_{e'} \ldots M_{m'})$, where a ' is 85 to 98 atomic %, b' through m' are each 0 to 15 atomic %, $a'+b'+c'+d'+e'+ \ldots +m'=100$ atomic %;
    wherein B, C, D, E, . . . M are modifiers selected from the group consisting of Al, Bi, Ca, Co, Cr, Cu, Fe, In, La, rare earth metals, Mg, Mn, Ru, Sb, Sn, Ti, Zn, Ba, Si and Sr; and
    wherein 1 atomic $\% < |a-a'|+|b-b'|+|c-c'|+|d-d'|+|e-e'|+ \ldots +|m-m'|<25$ atomic %.

15. The particle of claim 14 wherein the second material is an outer material having a cycle life greater than the first material.

16. The particle of claim 14 wherein at least one of said active materials is a composite having an embedded conductive material.

17. The particle of claim 14 wherein the second material has a plurality of channels extending from an outer most portion to an inner most portion of the second material for providing ion transport between an electrolyte and the first material.

18. The particle of claim 14 wherein B, C, D, and E are Co, Zn, Mg, and Ca, respectively; and
    $3 \leq b \leq 9$; $3 \leq b' \leq 9$;
    $c \leq 7$; $c' \leq 7$;
    $d \leq 2$; $d' \leq 2$;
    $e \leq 2$; $e' \leq 2$,
    wherein $a+b+c+d+e=100$ atomic %.

19. The particle of claim 14 wherein 1 atomic $\% \leq |a-a'|+|b-b'|+|c-c'|+|d-d'|+|e-e'|+ \ldots +|m-m'| \leq 16$ atomic %.

20. The positive electrode particle of claim 14 wherein the second active nickel hydroxide material has a mass equal to at least 20% of the particle mass.

21. The positive electrode particle of claim 14 wherein the second active positive electrode material is 20% to 55% of the particle mass.

22. A nickel hydroxide particle for use in a pasted positive electrode of a nickel metal hydride battery comprising:

a first active nickel hydroxide material;

a second active nickel hydroxide material disposed about the first material, wherein the second active nickel hydroxide material has a mass equal to at least 20% of the mass of the particle.

23. The particle of claim 22 wherein the second active positive electrode material is 20% to 55% of the particle mass.

24. The particle of claim 22 wherein the second active nickel hydroxide material has a plurality of channels extending from an outer most portion to an inner most portion of the second active nickel hydroxide material for providing ion transport between an electrolyte and the first active nickel hydroxide material.

25. The particle of claim 24 wherein the channels have an average pore size of 3.5 angstroms or greater.

26. The particle of claim 22 wherein the first active nickel hydroxide material and second active nickel hydroxide material have a compositional difference of 1 to 25 atomic %.

27. The particle of claim 22 wherein the first active nickel hydroxide material or the second active nickel hydroxide material is a composite having an embedded metallic conductive material.

28. The particle of claim 22 wherein the first active nickel hydroxide material and second active nickel hydroxide material have a compositional difference of 1 to 16 atomic %.

29. The particle of claim 22 wherein the second active nickel hydroxide material comprises Co at a concentration of 9 atomic % or less.

30. The particle of claim 22 wherein the second active nickel hydroxide material comprises Co, Zn, Ca, and Mg.

31. The particle of claim 22 wherein the first active nickel hydroxide material comprises Co, Zn, Ca, and Mg.

32. The particle of claim 22 wherein the first active nickel hydroxide material has a base composition selected from the group consisting of $(NiCo)(OH)_2$, $(NiCoZn)(OH)_2$, $(NiCoZnMgCa)(OH)_2$, $(NiCoZnMnMgCa)(OH)_2$, and $(NiCoZnMgCaCuMn)(OH)_2$.

33. The particle of claim 22 wherein the second active nickel hydroxide material has a base composition selected from the group consisting of $(NiCo)(OH)_2$, $(NiCoZn)(OH)_2$, $(NiCoZnMgCa)(OH)_2$, $(NiCoZnMnMgCa)(OH)_2$, and $(NiCoZnMgCaCuMn)(OH)_2$.

34. The particle of claim 32 wherein the second active nickel hydroxide material is an outer material having a cycle life greater than the first active nickel hydroxide material.

\* \* \* \* \*